(12) United States Patent
Morris et al.

(10) Patent No.: US 9,808,745 B2
(45) Date of Patent: *Nov. 7, 2017

(54) FILTER ELEMENT AND FILTER ASSEMBLY WITH RECIRCULATION

(71) Applicant: Caterpillar Inc., Peoria, IL (US)

(72) Inventors: Bryant A. Morris, Peoria, IL (US); Jeffrey R. Ries, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 737 days.

This patent is subject to a terminal disclaimer.

(21) Appl. No.: 14/223,125

(22) Filed: Mar. 24, 2014

(65) Prior Publication Data

US 2015/0265953 A1    Sep. 24, 2015

(51) Int. Cl.
*B01D 27/07* (2006.01)
*B01D 27/10* (2006.01)
*B01D 29/11* (2006.01)
*B01D 29/15* (2006.01)
*B01D 29/23* (2006.01)
*B01D 29/88* (2006.01)
(Continued)

(52) U.S. Cl.
CPC .......... *B01D 29/232* (2013.01); *B01D 27/07* (2013.01); *B01D 27/103* (2013.01); *B01D 29/114* (2013.01); *B01D 29/117* (2013.01); *B01D 29/15* (2013.01); *B01D 29/21* (2013.01); *B01D 29/885* (2013.01); *B01D 2201/0415* (2013.01); *B01D 2201/291* (2013.01); *F16N 39/06* (2013.01)

(58) Field of Classification Search
CPC ...... B01D 27/07; B01D 27/10; B01D 27/103; B01D 29/114; B01D 29/117; B01D 29/15; B01D 29/232; B01D 29/885; B01D 29/21; B01D 2201/291; B01D 2201/0415; F02M 37/22; F02M 37/221; F02M 37/223; F02M 2037/225; F02M 2037/226; F02M 2037/228; F16N 39/06
See application file for complete search history.

(56) References Cited

U.S. PATENT DOCUMENTS

2002/0148788 A1    10/2002    Berns et al.
2010/0051524 A1    3/2010    Marshall et al.
(Continued)

FOREIGN PATENT DOCUMENTS

DE    102008017248    1/2009
WO    2005044420    5/2005

*Primary Examiner* — Lucas Stelling
(74) *Attorney, Agent, or Firm* — Claim Construction PLLC

(57) ABSTRACT

A filter element may include a tubular member including a partition at least partially defining first and second chambers. The tubular member may further include at least one outlet aperture and at least one inlet aperture configured to provide flow communication exiting from the first chamber and flow communication into the second chamber, respectively. The filter element may be configured such that fluid passing through the filter element from an inlet port to an outlet port passes through the first chamber, a filter medium, and the second chamber. The filter element may also include an end cap having a return aperture configured to provide flow communication between fluid exiting from the first chamber and fluid entering the inlet port, wherein a portion of fluid exiting from the first chamber is returned to the inlet port for recirculation through the first chamber.

13 Claims, 6 Drawing Sheets

(51) Int. Cl.
  *B01D 29/21* (2006.01)
  *F16N 39/06* (2006.01)

(56)  References Cited

U.S. PATENT DOCUMENTS

| | | |
|---|---|---|
| 2011/0036770 A1* | 2/2011 | Jokschas ................ F02M 37/22 |
| | | 210/440 |
| 2011/0049015 A1 | 3/2011 | Babcock et al. |
| 2011/0253608 A1 | 10/2011 | Volkmer et al. |
| 2013/0327729 A1 | 12/2013 | Apostolides et al. |
| 2013/0334147 A1 | 12/2013 | Salvador et al. |

* cited by examiner

US 9,808,745 B2

FILTER ELEMENT AND FILTER ASSEMBLY WITH RECIRCULATION

TECHNICAL FIELD

The present disclosure relates to a filter element and filter assembly including the filter element, and more particularly, to a filter element configured to facilitate recirculation of fluid through the filter element.

BACKGROUND

Engines, including compression-ignition engines, spark-ignition engines, gasoline engines, gaseous fuel-powered engines, and other internal combustion engines, may operate more effectively with fuel from which contaminates have been removed prior to the fuel reaching a combustion chamber of the engine. In particular, fuel contaminates, if not removed, may lead to undesirable operation of the engine and/or may increase the wear rate of engine components, such as, for example, fuel system components.

Effective removal of contaminates from the fuel system of a compression-ignition engine may be particularly important. In some compression-ignition engines, air is compressed in a combustion chamber, thereby increasing the temperature and pressure of the air, such that when fuel is supplied to the combustion chamber, the fuel and air mixture ignite. If water and/or other contaminates are not removed from the fuel, the contaminates may interfere with and/or damage, for example, fuel injectors, which may have orifices manufactured to exacting tolerances and shapes for improving the efficiency of combustion and/or reducing undesirable exhaust emissions. Moreover, the presence of water in the fuel system may cause considerable engine damage and/or corrosion in the injection system.

Fuel filtration systems serve to remove contaminates from the fuel. For example, some conventional fuel systems may include a primary fuel filter, which removes water and large particulate matter, and a secondary fuel filter, which removes a significant portion of remaining particulate matter (e.g., smaller contaminates), such as fine particulate matter. A typical secondary fuel filter may include a filter element contained within in a housing. The filter element may be arranged within the housing, such that a given volume of fuel is filtered by the filter element. Thus, in a system including a primary filter and a secondary filter, a given volume of fuel is filtered via filtration media twice—once in the primary filter where water and relatively large particulate matter may be removed, and once in the secondary filter where relatively small particulate matter may be removed. In some systems, attempts to improve the effectiveness of filtration systems have resulted in providing additional, separate fuel filters to supplement the primary and secondary fuel filters. The addition of such supplemental fuel filters, however, may be undesirable due, for example, to space and/or packaging constraints associated with the environment of the engine, which may render adding supplemental fuel filters problematic.

An attempt to provide desired filtration is described in U.S. Patent Application Publication No. US 2010/0051524 A1 ("the '524 publication") to Marshall et al., published Mar. 4, 2010. Specifically, the '524 publication discloses a return flow filtration assembly for filtering return hydraulic fluid. The filtration assembly includes a first return fluid chamber including a first inlet and first and second outlets. The second outlet is configured to be coupled to a secondary return flow filter for providing micro-filtering of the return fluid. The first outlet includes a restriction element for restricting flow through the first outlet and generating an artificial back pressure within the first return fluid chamber to drive fluid through the second outlet when the second outlet is coupled to a secondary return flow filter.

Although the return flow filtration assembly of the '524 publication may provide for supplemental filtration, it may suffer from a number of possible drawbacks. For example, it may use space inefficiently for some applications, require a relatively complex flow arrangement, and may still not provide a desirable level of filtration.

The filter element and filter assembly disclosed herein may be directed to mitigating or overcoming one or more of the possible drawbacks set forth above.

SUMMARY

In one aspect, the present disclosure is directed to a filter element. The filter element may include a tubular member having a longitudinal axis. The tubular member may include a partition at least partially defining a first chamber and at least partially defining a second chamber. The partition may extend longitudinally in the tubular member and be configured to prevent flow communication between the first chamber and the second chamber within the tubular member. The tubular member may also include an end portion at least partially defining an inlet port configured to provide flow communication into the first chamber, and at least partially defining an outlet port configured to provide flow communication exiting from the second chamber. The tubular member may further include at least one outlet aperture configured to provide flow communication exiting from the first chamber, and at least one inlet aperture configured to provide flow communication into the second chamber. The filter element may further include a filter medium associated with the at least one outlet aperture and the at least one inlet aperture, wherein the filter element is configured such that fluid passing through the filter element from the inlet port to the outlet port passes through the first chamber, the filter medium, and the second chamber. The filter element may also include an end cap having a return aperture configured to provide flow communication between fluid exiting from the first chamber and fluid entering the inlet port, wherein a portion of fluid exiting from the first chamber is returned to the inlet port for recirculation through the first chamber.

According to a further aspect, a filter assembly may include a filter base configured to be coupled to a machine, a canister having an open end and a closed end and being configured to be coupled to the filter base, and a filter element configured to be received in the canister. The filter element may include a tubular member having a longitudinal axis. The tubular member may include a partition at least partially defining a first chamber and at least partially defining a second chamber. The partition may extend longitudinally in the tubular member and be configured to prevent flow communication between the first chamber and the second chamber within the tubular member. The tubular member may also include an end portion at least partially defining an inlet port configured to provide flow communication into the first chamber, and at least partially defining an outlet port configured to provide flow communication exiting from the second chamber. The tubular member may further include at least one outlet aperture configured to provide flow communication exiting from the first chamber, and at least one inlet aperture configured to provide flow communication into the second chamber. The filter element may further include a filter medium associated with the at least one outlet aperture and the at least one inlet aperture, wherein the filter element is configured such that fluid passing through the filter element from the inlet port to the outlet port passes through the first chamber, the filter medium, and the second chamber. The filter element may also include a return aperture configured to provide flow communication between fluid exiting from the first chamber and fluid entering the inlet port, wherein a portion of fluid exiting from the first chamber is returned to the inlet port for recirculation through the first chamber.

According to still a further aspect, a fuel system may include a pump configured to draw fuel from a tank and supply fuel to an engine, a primary filter assembly in flow communication with the pump and configured to at least one of separate fluid from the fuel and filter particles from the fuel, and a secondary filter assembly in flow communication with the pump and configured to filter particles from the fuel. The fuel system may further include fluid lines providing flow communication between the primary filter assembly and the pump, and between the pump and a secondary filter assembly. The secondary filter assembly may include a filter base, a canister having an open end, a closed end, and being configured to be coupled to the filter base, and a filter element configured to be received in the canister. The filter element may include a tubular member having a longitudinal axis, and a partition at least partially defining a first chamber and at least partially defining a second chamber. The partition may extend longitudinally in the tubular member and be configured to prevent flow communication between the first chamber and the second chamber within the tubular member. The tubular member may further include an end portion at least partially defining an inlet port configured to provide flow communication into the first chamber, and at least partially defining an outlet port configured to provide flow communication exiting from the second chamber. The tubular member may further include at least one outlet aperture configured to provide flow communication exiting from the first chamber, and at least one inlet aperture configured to provide flow communication into the second chamber. The filter element may further include a filter medium associated with the at least one outlet aperture and the at least one inlet aperture, wherein the filter element is configured such that fluid passing through the filter element from the inlet port to the outlet port passes through the first chamber, the filter medium, and the second chamber. The filter element may further include a return aperture configured to provide flow communication between fluid exiting from the first chamber and fluid entering the inlet port, wherein a portion of fluid exiting from the first chamber is returned to the inlet port for recirculation through the first chamber.

DETAILED DESCRIPTION

Figure 1:
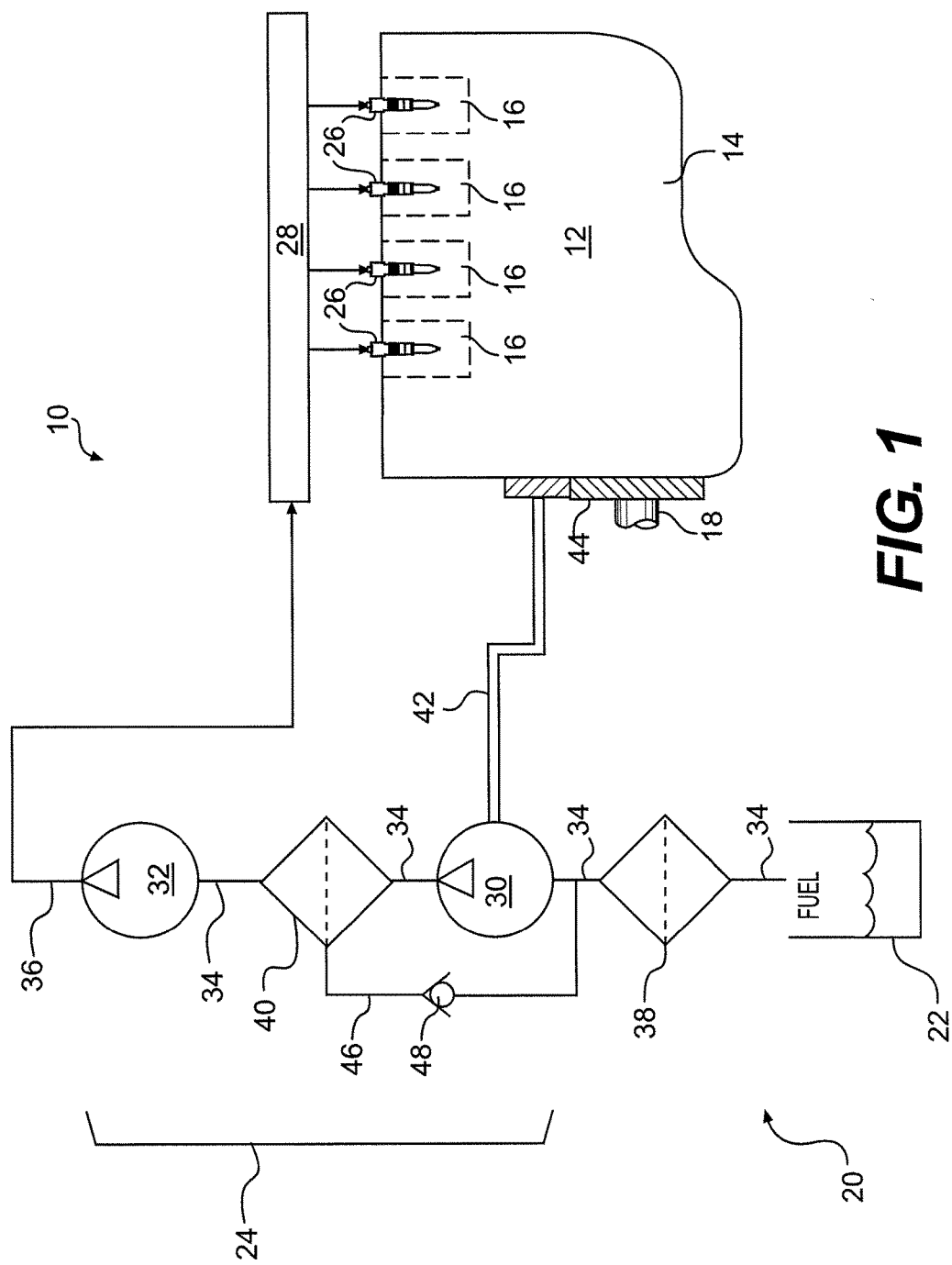
FIG. 1 is a schematic illustration of an exemplary embodiment of a power system.

FIG. 1 illustrates an exemplary embodiment of a power system 10 configured to convert fuel and air into mechanical work. Power system 10 includes an engine 12 (e.g., a four-stroke compression-ignition engine). One skilled in the art will recognize that engine 12 may be any type of internal combustion engine, such as, for example, a spark-ignition engine, a gasoline engine, or a gaseous fuel-powered engine. Engine 12 may include a block 14 that at least partially defines a plurality of combustion chambers 16. As shown in FIG. 1, exemplary engine 12 includes four combustion chambers 16. It is contemplated that engine 12 may include a greater or lesser number of combustion chambers 16, and that combustion chambers 16 may be disposed in any configuration, such as, for example, in an "in-line" configuration, a "V" configuration, or any other known configuration. Engine 12 may include a crankshaft 18 that is rotatably disposed within block 14. Connecting rods (not shown) may connect a plurality of pistons (not shown) to crankshaft 18, so that combustion within a combustion chamber 16 results in a reciprocating motion of each piston within a respective combustion chamber 16, which, in turn, results in rotation of crankshaft 18, as is conventional in a reciprocating-piston engine.

Power system 10 may include a fuel system 20 configured to deliver injections of pressurized fuel into each of combustion chambers 16 according to a timing scheme resulting in coordinated combustion within combustion chambers 16. For example, fuel system 20 may be a common rail system and may include a tank 22 configured to hold a supply of fuel, and a fuel pumping arrangement 24 configured to convey and/or pressurize the fuel and direct the fuel to a plurality of fuel injectors 26 associated with the respective combustion chambers 16 via a flow path 28 (e.g., a fuel rail).

For example, pumping arrangement 24 may include one or more pumping devices configured to increase the pressure of the fuel and direct one or more pressurized streams of fuel to flow path 28. According to some embodiments, pumping arrangement 24 may be include a low pressure pump 30 and a high pressure pump 32 disposed in series and fluidly connected by way of one or more fluid lines 34 (e.g., a series of fuel lines). Low pressure pump 30 may be a transfer pump that provides a low pressure fuel feed to high pressure pump 32. High pressure pump 32 may receive a low pressure fuel feed and increase the pressure of the fuel up to as much as, for example, 300 MPa. High pressure pump 32 may be operably coupled to flow path 28 via a fluid line 36.

According to the exemplary embodiment shown in FIG. 1, low pressure pump 30 and/or high pressure pump 32 may be operatively coupled to engine 12 and may be driven, for example, via crankshaft 18, either directly or indirectly. For example, low pressure pump 30 and/or high pressure pump 32 may be operably coupled to crankshaft 18 in any manner known to those skilled in the art, such that rotation of crankshaft 18 will result in a corresponding driven rotation of low pressure pump 30 and/or high pressure pump 32. For example, a driveshaft 42 of high pressure pump 32 is shown in FIG. 1 as being operably coupled to crankshaft 18 via a gear train 44. It is contemplated, however, that low pressure pump 30 and/or high pressure pump 32 may alternatively be driven electrically, hydraulically, pneumatically, or in any other known manner (e.g., via one or more drive belts). It is further contemplated that fuel system 20 may also include, for example, a mechanical fuel injector system and/or a hydraulic fuel injector system, where the pressure of the injected fuel is generated and/or enhanced within individual injectors, with or without the use of a high pressure source.

According to some embodiments, one or more filtering assemblies, such as, for example, a primary filter assembly 38 and/or a secondary filter assembly 40, may be disposed along fluid lines 34 (e.g., in a series relationship, as shown), and may be configured to remove contaminates, such as water and/or particulate matter from the fuel. For example, primary filter assembly 38 may include a filter element (not shown) configured to remove water and/or relatively large particulate matter from fuel received from tank 22. According to some embodiments, secondary filter assembly 40 may include a filter element configured to remove particulate matter from fuel that has not been removed via primary filter assembly 38 (e.g., relatively smaller particulate matter), as described in more detail below. For example, primary filter assembly 38 may include a filter medium configured to remove non-fuel liquid (e.g., water) and/or about 10 micron-size and larger particles, and secondary filter assembly 40 may include a filter medium configured to remove about 3 micron-size and larger particles. Filter media configured to remove fluid and/or particles having different characteristics are contemplated.

According to some embodiments, fuel system 20 may be configured to recirculate a portion of fluid passing partially through secondary filter assembly 40 to a point upstream of an inlet of second filter assembly 40, so that the portion of fluid is subjected to additional filtration by secondary filter assembly 40 prior to being supplied to engine 12. For example, as shown in FIG. 1, exemplary fuel system 20 includes a return line 46 providing flow communication between secondary filter assembly 40 and fluid line 34 at a point upstream of secondary filter assembly 40. In the exemplary embodiment shown, return line 46 provides flow communication to a point downstream of primary filter assembly 38 and upstream of low pressure pump 30. The exemplary embodiment shown also includes a check valve 48 configured to prevent a reverse flow of fluid back into secondary filter assembly 40 via return line 46. As explained in more detail below, this exemplary arrangement may result in improved filtration of fluid by secondary filter assembly 40.

Figure 2:
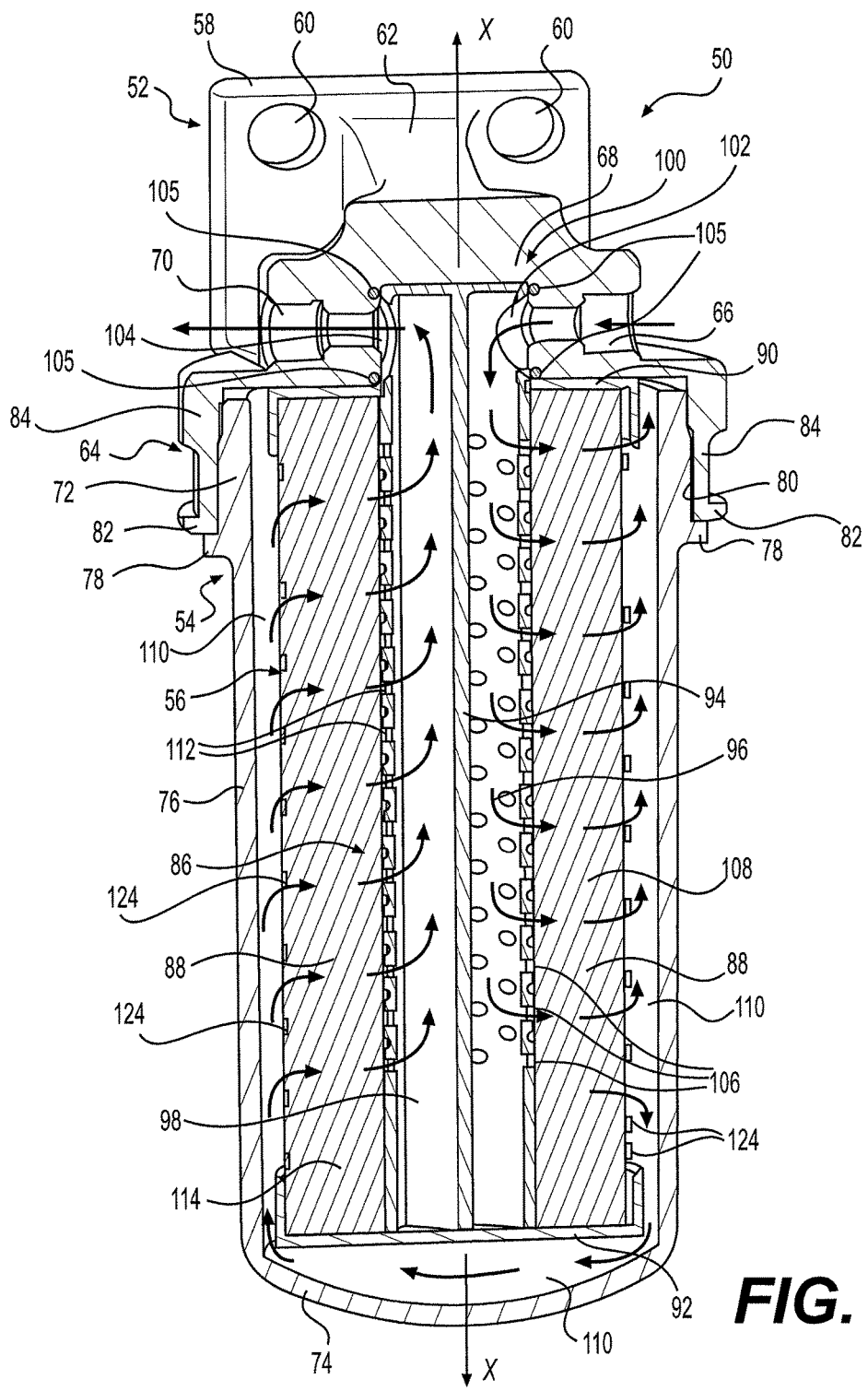
FIG. 2 is a perspective section view of an exemplary embodiment of a filter assembly.

FIG. 2 illustrates an exemplary embodiment of a filter assembly 50. Filter assembly 50 may be used to filter fluids such as, for example, fuel (e.g., as a secondary filter assembly 40 shown in FIG. 1), lubricants, coolants, and hydraulic fluid used by machines. According to some embodiments, filter assembly 50 may be used as a fuel/water separator filter (as in exemplary primary filter assembly 38) and/or as an air filter. Other uses may be contemplated.

Exemplary filter assembly 50 shown in FIG. 2 includes a filter base 52 configured to couple filter assembly 50 to a machine, a canister 54 configured to be coupled to filter base 52, and a filter element 56 configured to be received in canister 54. Exemplary filter base 52 includes a mounting bracket 58 having at least one hole 60 (e.g., two holes 60) for receiving a fastener for coupling filter base 52 to a machine. Other coupling configurations are contemplated. Exemplary filter base 52 also includes an extension 62 and a canister coupler 64 configured to be coupled to canister 54. Extension 62 serves to space canister coupler 64 from mounting bracket 58 to provide clearance for canister 54.

As shown in FIG. 2, exemplary canister coupler 64 of filter base 52 includes an inlet passage 66, a receiver 68, and an outlet passage 70. Exemplary inlet passage 66 is configured to be coupled to a fluid conduit of a fluid system, such as, for example, a fuel system (e.g., fluid line 34 shown in FIG. 1), a lubrication system, a hydraulic system, or a coolant system, such that it receives fluid for filtration in filter assembly 50. Exemplary receiver 68 is configured to receive a portion of filter element 56, as explained in more detail herein. Exemplary outlet passage 70 is configured to be coupled to a fluid conduit of the fluid system (e.g., fluid line 34 shown in FIG. 1), such that fluid exiting filter assembly 50 returns to the fluid system following filtration.

Exemplary canister 54 shown in FIG. 2 includes an open end 72, an oppositely-disposed closed end 74, and a body portion 76 extending therebetween. Canister 54 includes a mounting flange 78 adjacent open end 72. In the exemplary embodiment shown, open end 72 of canister 54 is received in an open-ended housing 80 of filter base 52, with mounting flange 78 abutting an end 82 of a housing wall 84 of housing 80. One or more seals (not shown) of a type known to those skilled in the art may be provided between open end 72 of canister 54 and housing 80 to provide a fluid-tight barrier between canister 54 and housing 80 (e.g., between open end 72 and housing wall 84). Engagement structures (not shown) of a type known to those skilled in the art may be provided to secure canister 54 to filter base 52.

Exemplary canister 54 and housing 80 may define respective cross-sections. For example, canister 54 and housing 80 may define respective cross-sections that are substantially circular, substantially oval-shaped, and/or substantially polygonal. According to some embodiments, the cross-sections may be substantially constant along the longitudinal length of canister 54 (e.g., as shown in FIG. 2). According to some embodiments, the cross-sections may vary along the longitudinal length of canister 54. The cross-sections may be chosen based on various considerations, such as, for example, the size and shape of the available space at a location of a machine that receives filter assembly 50.

As shown in FIG. 2, exemplary filter element 56 is received in canister 54 and cooperates with filter base 52 and canister 54, such that fluid received in inlet passage 66 of filter base 54 is filtered by filter element 56 and exits outlet passage 70 of filter base 54 following filtration. According to some embodiments, filter element 56 is configured such that fluid passing through filter element 56 from inlet passage 66 of filter base 52 to outlet passage 70 of filter base 52 is subjected to two filtration processes.

Figure 3:
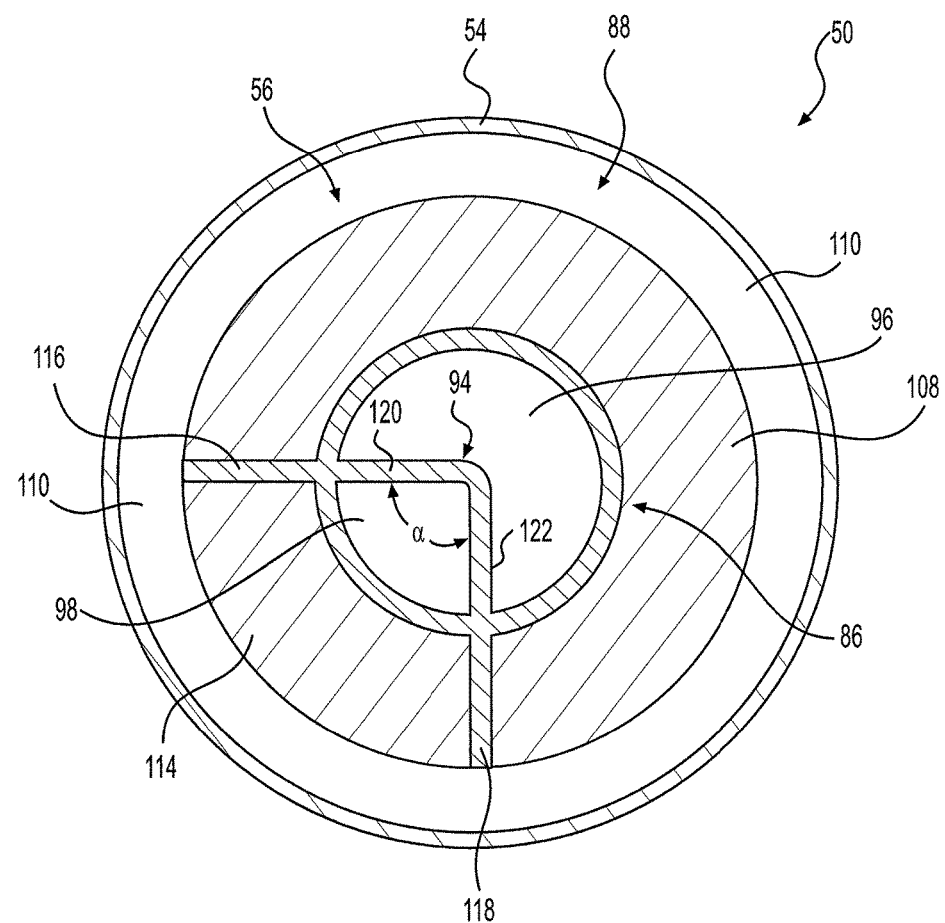
FIG. 3 is a partial end section view of the exemplary filter assembly shown in FIG. 2.

As shown in FIGS. 2 and 3, exemplary filter element 54 includes a tubular member 86 substantially surrounded by a filter medium 88. Filter medium 88 may include any filter medium type known to those skilled in the art, such as, for example, foam-type, paper-type, and combinations thereof. Some embodiments of filter element 54 include a first end cap 90 coupled at a longitudinal end of tubular member 86 at an end configured to be adjacent filter base 52 upon installation, and a second end cap 92 coupled at a longitudinal end of tubular member 86 opposite first end cap 90.

In the exemplary embodiment shown in FIGS. 2 and 3, tubular member 86 of filter element 56 defines a longitudinal axis X and includes a partition 94 at least partially defining a first chamber 96 and at least partially defining a second chamber 98. As shown, exemplary partition 94 extends longitudinally within tubular member 86 and prevents flow communication between first chamber 96 and second chamber 98 within tubular member 86. Tubular member 86 includes an end portion 100 at least partially defining an inlet port 102 and at least partially defining an outlet port 104. For example, for embodiments in which tubular member 86 has a substantially circular cross-section, inlet port 102 may be located circumferentially opposite outlet port 104.

As shown in FIGS. 2 and 3, exemplary end portion 100 is received in receiver 68 of filter base 52. One or more seals 105, such as, for example, O-ring seals shown in FIGS. 2 and 3, may be provided to create a fluid-tight seal between end portion 100 of tubular member 86 and filter base 52. Exemplary inlet port 102 provides flow communication between inlet passage 66 of filter base 54 and first chamber 96 of tubular member 86. Exemplary outlet port 104 provides flow communication between second chamber 98 of tubular member 86 and outlet passage 70 of filter base 54. In the exemplary embodiment shown, inlet passage 66 and inlet port 102 provide the only fluid entry point for fluid entering filter element 56, and outlet port 104 and outlet passage 70 provide the only fluid exit point for fluid exiting filter element 56 after passage through second chamber 98.

As shown in FIG. 2, exemplary tubular member 86 includes at least one outlet aperture 106 (e.g., a plurality of outlet apertures 106 as shown) configured to provide flow communication for fluid exiting from first chamber 96, through a first portion 108 of filter medium 88, and into an interior space 110 of canister 54. Exemplary tubular member 86 also includes at least one inlet aperture 112 (e.g., a plurality of inlet apertures 112 as shown) configured to provide flow communication from interior space 110 of canister 54, through a second portion 114 of filter medium 88, and into second chamber 98 of tubular member 86. As shown in FIGS. 2 and 3, first portion 108 of filter medium 88 is associated with outlet apertures 106, and second portion 114 of filter medium 88 is associated with inlet apertures 112. In particular, first portion 108 is located exterior and adjacent to outlet apertures 106, such that fluid flowing from first chamber 96 into interior space 110 of canister 54 passes through first portion 108, thereby filtering the fluid passing through outlet apertures 106. Second portion 114 is located exterior and adjacent to inlet apertures 112, such that fluid flowing from interior space 110 of canister 54 into second chamber 98 passes through second portion 114, thereby filtering the fluid passing through inlet apertures 112.

As shown in FIG. 2, exemplary filter assembly 50 is configured such that fluid passing through the filter element 56 enters filter assembly 50 via inlet passage 66 of filter base 52. Fluid flows from inlet passage 66 into inlet port 102 of end portion 100 and into first chamber 96. Thereafter, fluid flows out of at least one outlet aperture 106, through first portion 108 of filter medium 88, and into interior space 110 of canister 54. Passing through first portion 108 of filter medium 88 results in the fluid being subjected to a first filtration process. Once in interior space 110 of canister 54 following the first filtration process, the fluid is able to flow around filter element 56 within canister 54 and enter second chamber 98 of tubular member 86. For example, fluid may flow circumferentially around exemplary filter element 56 and/or between second end cap 92 and closed end 74 of canister 54 to second portion 114 of filter medium 88. Thereafter, the fluid passes through second portion 114 of filter medium 88, through at least one inlet aperture 112, and into second chamber 98. Passing through second portion 114 of filter medium 88 results in the fluid being subjected to a second filtration process. Thereafter, the fluid flows from second chamber 98 via tubular member 86 to outlet port 104, and exits filter element 56 via outlet passage 70 of filter base 52. Thus, in this exemplary embodiment, fluid passing through filter element 56 from inlet port 102 to outlet port 104 passes through both first chamber 96 and second chamber 98, for example, such that the fluid passing through filter element 56 from inlet port 102 to outlet port 104 passes through both first portion 108 of filter medium 88 and second portion 114 of filter medium 88. In this exemplary manner, fluid entering filter assembly 50 is subjected to two filtration processes within a single filter assembly including a single canister and a single filter element.

As shown in FIGS. 2 and 3, exemplary tubular member 86 includes at least a first barrier 116 and a second barrier 118 extending radially from the exterior surface of tubular member 86. As shown in FIG. 3, first portion 108 of filter medium 88 extends between first barrier 116 and second barrier 118 in association with first chamber 96. Second portion 114 of filter medium 88 extends between first barrier 116 and second barrier 118 in association with second chamber 98. First barrier 116 and second barrier 118 serve to prevent fluid exiting outlet apertures 106 from entering inlet apertures 112 without first passing through the entire thickness of first portion 108 and the entire thickness of second portion 114 of filter medium 88.

According to some embodiments, first barrier 116 and/or second barrier 118 may be substantially planar, for example, as shown in FIG. 3. According to some embodiments, first barrier 116 and/or second barrier 118 may be curved. According to some embodiments, first barrier 116 and/or second barrier 118 may have a length such that respective ends of the barriers are substantially flush with an exterior surface of filter medium 88, for example, as shown in FIG. 3. According to some embodiments, first barrier 116 and/or second barrier 118 may have a length such that respective ends of the barriers extend beyond the exterior surface of filter medium 88. According to some embodiments, first barrier 116 and/or second barrier 118 may have a length such that respective ends of the barriers do not reach the exterior surface of filter medium 88.

In the exemplary embodiment shown, tubular member 86 has a substantially circular cross-section. According to some embodiments, tubular member 86 may have other cross-sections, such as, for example, substantially oval-shaped and substantially polygonal. According to some embodiments, the cross-sectional shape of tubular member 86 may be substantially constant along its longitudinal length, for example, as shown. According to some embodiments, the cross-section of tubular member 86 may vary along its longitudinal length. The cross-section may be chosen based on various considerations, such as, for example, the size and shape of the available space at a location of a machine that receives filter assembly 10.

As shown in FIG. 3, partition 94 of tubular member 86 may be curved or include a number of segments joined to one another. For example, exemplary partition 94 includes a first segment 120 joined to a second segment 122, with first segment 120 and second segment 122 meeting an angle α with respect to each other. For example, angle α may range from about 20 degrees to about 180 degrees, from about 30 degrees to about 150 degrees, from about 40 to about 120 degrees, from about 60 degrees to about 110 degrees, or from about 70 degrees to about 100 degrees (e.g., about 90 degrees). Angle α may be selected based on various considerations, such as, for example, the desired level of difference in filtration provided by first portion 108 of filter medium 88 and second portion 114 of filter medium 88.

According to some embodiments, the filter medium of first portion 108 may have the same filtering characteristics as the filter medium of second portion 114. According to some embodiments, the filter medium of first portion 108 may have different filtering characteristics than the filter medium of second portion 114. According to some embodiments, first portion 108 and second portion 114 of filter medium 88 may have the same thickness, a different thickness, and/or a different length (e.g., a different circumferential length).

As shown in FIG. 3, exemplary first barrier 116 and second barrier 118 form extensions of partition 94 by being coupled to the exterior surface of tubular member 86 at the same circumferential locations as the points at which the ends of partition 94 are coupled to the interior surface of tubular member 86. According to some embodiments, first barrier 116 and second barrier 118 are coupled to the exterior surface of tubular member 86 at circumferential locations different from the points at which the ends of partition 94 are coupled to the interior surface of tubular member 86.

Figure 6:
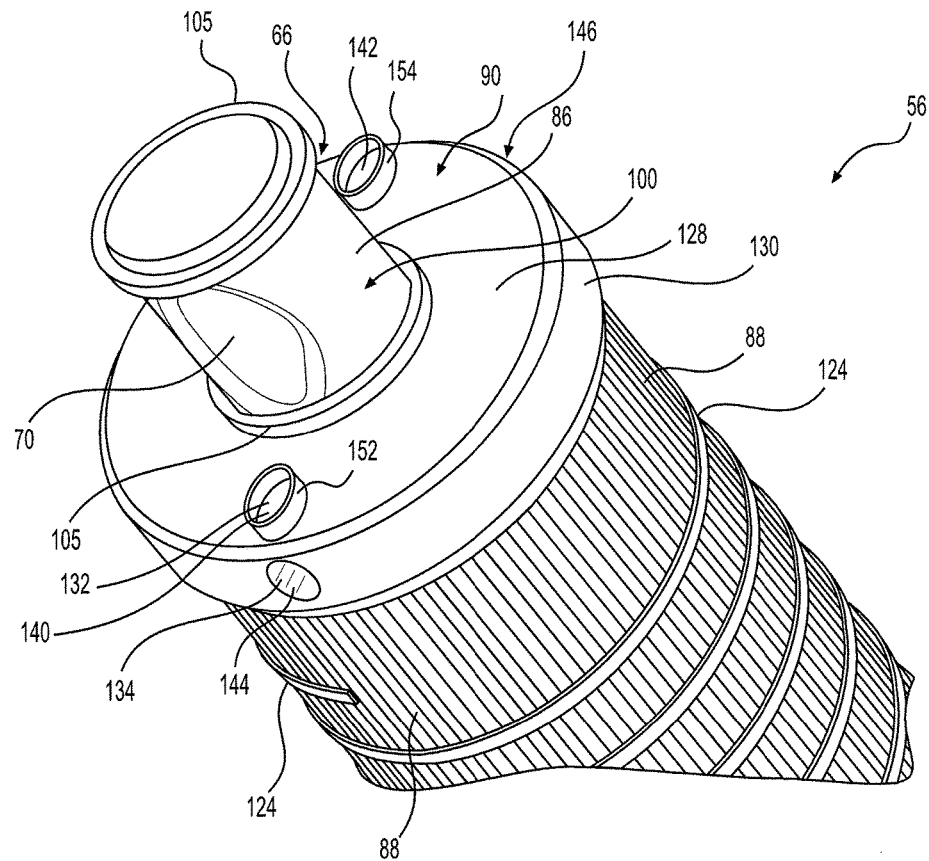
FIG. 6 is partial perspective view of a portion of the exemplary filter assembly shown in FIG. 2.

As shown in FIGS. 2 and 6, exemplary filter element 56 includes a spirally-wound roving 124 configured to secure filter medium 88 against tubular member 86. For example, roving 124 may serve to hold both first portion 108 and second portion 114 of filter medium 88 against tubular member 86 (FIG. 3). Although the exemplary embodiment shown includes spirally-wound roving 124 (see FIGS. 2 and 6), alternative ways to couple filter medium 88 to tubular member 86 are contemplated.

According to some embodiments, filter assembly 50 may be configured to provide flow communication between fluid exiting from first chamber 96 and fluid entering inlet port 102 of filter base 52, such that a portion of fluid exiting first chamber 96 is returned to inlet port 102 for recirculation through first chamber 96. In this manner, the recirculated portion of fluid may be subjected to more than a single filtration via first portion 108 of filter media 88 prior to being supplied to second chamber 98. For example, filter assembly 50 may be used, for example, as a secondary filter assembly 40 (see FIG. 1) configured to provide flow communication between interior space 110 of canister 54 and return line 46, so that a portion of fluid may be returned upstream of inlet port 102 (e.g., downstream from primary filter assembly 38 and upstream of low pressure pump 30), so that the portion of fluid will be returned to secondary filter assembly 40 for additional filtration.

Figure 4:
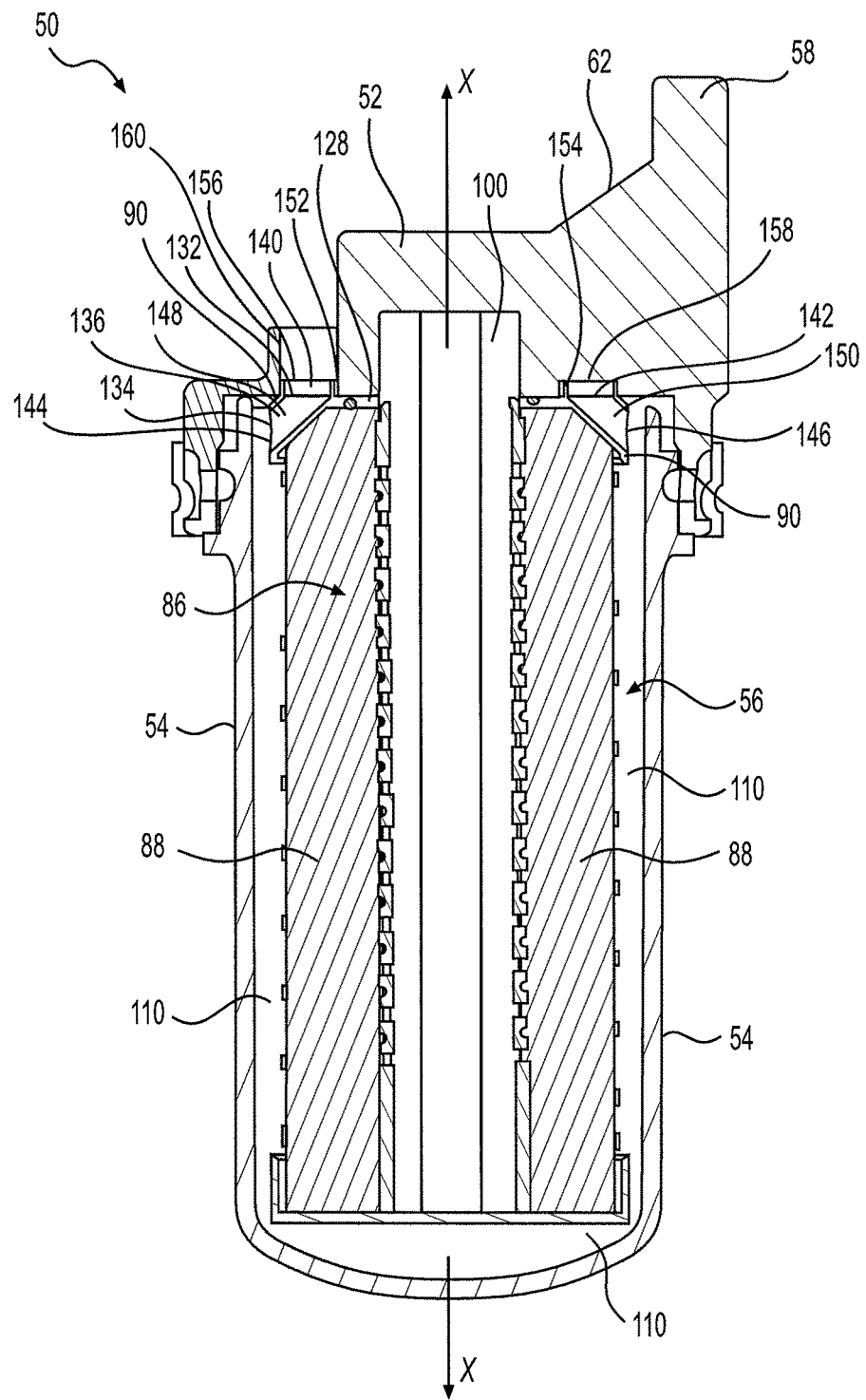
FIG. 4 is a perspective, alternative section view of the exemplary filter assembly shown in FIG. 2.
Figure 5:
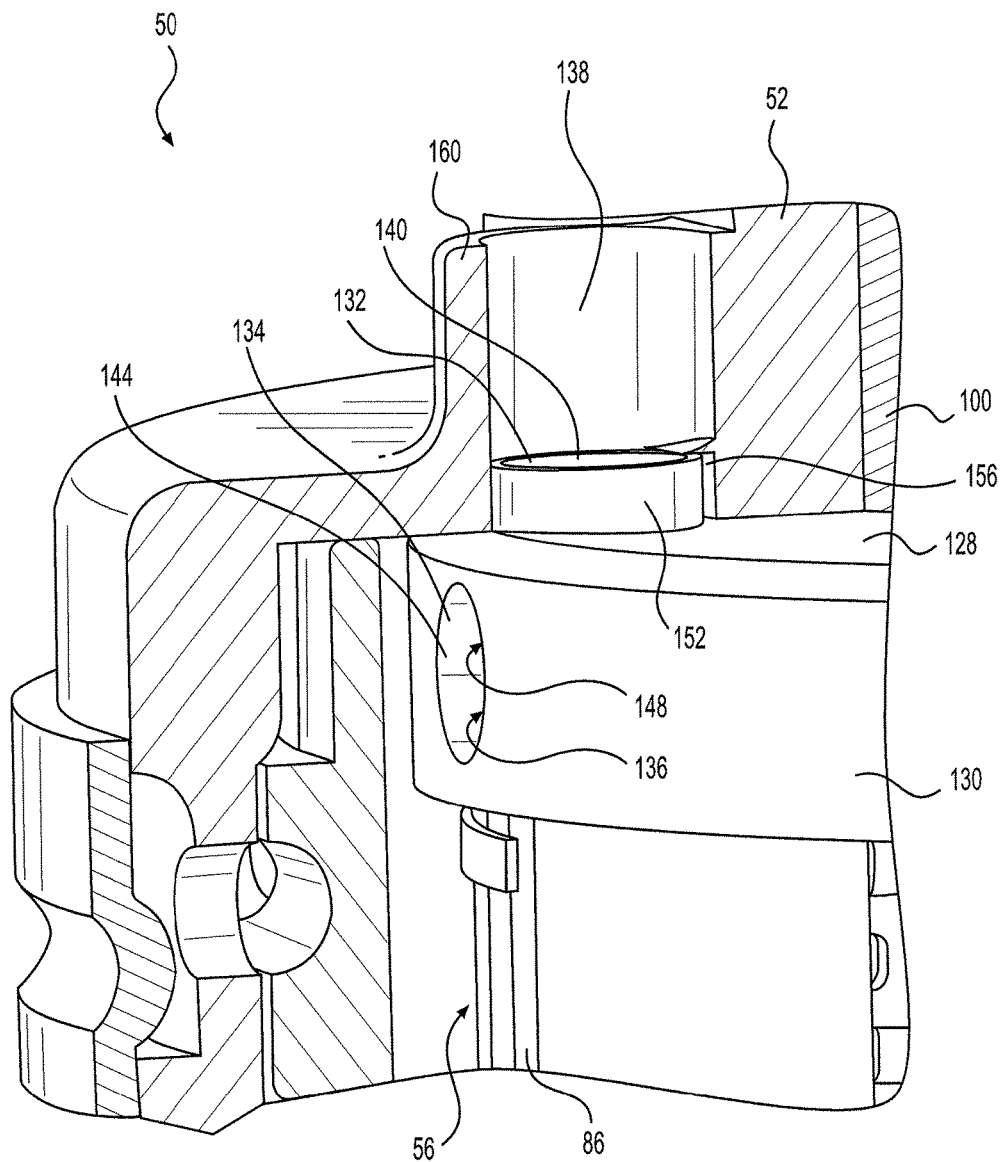
FIG. 5 is a partial, perspective section view of a portion of the exemplary filter assembly shown in FIG. 2.

For example, in the exemplary embodiment shown in FIGS. 4-6, first end cap 50 includes a plate 128 extending transverse (e.g., perpendicular) to longitudinal axis X of tubular member 86 and a wall 130 extending transverse (e.g., perpendicular) to plate 128. For example, plate 128 may be substantially circular, and wall 130 may take the form of cylindrical barrier. In the exemplary embodiment shown, plate 128 includes a return aperture 132, wall includes a return orifice 134, and first end cap 90 includes a tubular return passage 136 extending between return aperture 132 and return orifice 134 to provide flow communication between return aperture 132 and return orifice 134. For example, return passage 136 may extend obliquely with respect to longitudinal axis X of tubular member 86. Other configurations of return aperture 132, return orifice 134, and/or return passage 136 are contemplated. Exemplary filter base 52 includes a return port 138 in flow communication with return aperture 132 and configured to be coupled to return line 46 (see FIG. 1) to provide flow communication to fluid line 34.

According to some embodiments, filter element 56 may be configured such that it can be coupled to either side of, for example, engine 12. Such embodiments may provide more flexibility with installation and packaging for a machine. For example, exemplary filter assembly 50 shown in FIGS. 4-6 may be coupled to a machine such that fluid flows through filter assembly 50 from inlet port 102 (FIG. 2), through first chamber 96, through first portion 108 of filter medium 88, through interior space 110 of canister 54, through second portion 114 of filter medium 88, through second chamber 98, and out outlet port 104, in either direction based on the orientation of the mounting of filter base 52 with respect to the machine and the orientation of the mounting of filter element 56 with respect to filter base 52.

For example, exemplary filter element 56 includes two return apertures located opposite one another on plate 128 relative to end portion 100 of tubular member 86, as shown in FIGS. 4 and 6. For example, return aperture 132 is a first return aperture 140, and first end cap 90 includes a second return aperture 142. In the exemplary embodiment shown, return orifice 134 is a first return orifice 144, and wall 130 includes a second return orifice 146, with return passage 136 being a first return passage 148 and extending between first return aperture 140 and first return orifice 144. A second return passage 150 extends between second return aperture 142 and second return orifice 146.

According to the exemplary embodiment shown, first end cap 90 includes a first flange 152 extending around first return aperture 140 transverse to plate 128, and a second flange 154 extending around second return aperture 142. According to some embodiments, first flange 152 and/or second flange 154 may extend completely around their respective apertures, for example, forming a substantially circular collar. Exemplary filter base 52 includes a first recess 156 and a second recess 158 configured to receive either first flange 152 or second flange 154, depending on the orientation of filter element 56 with respect to filter base 52. For example, as shown, second recess 158 is located adjacent mounting bracket 58 and does not include a return port. Thus, exemplary second recess 158 serves to block fluid flow communication from second return aperture 142 of filter element 56. However, first recess 156 is associated with (e.g., aligned with) return port 138 and is substantially aligned with first return aperture 140, such that fluid communication is provided between first return aperture 140 and inlet port 102, so that fluid may be recirculated through first chamber 96 of filter assembly 50 without passing through second chamber 98 of filter element 56 and outlet port 104 of filter base 52.

In the exemplary embodiment shown, filter base 52 includes a boss 160 (FIGS. 4 and 5) configured to be coupled to return line 46 (FIG. 1). For example, exemplary boss 160 includes a tubular element (e.g., a hollow cylindrical element) including return port 138, as shown in FIG. 5. Other known configurations of bosses for coupling to a fluid line are contemplated.

In the exemplary configuration shown, the portion of fluid exiting from first chamber 96 that is returned to inlet port 102 for recirculation through first chamber 96 may pass through first chamber 96 at least twice before passing through second chamber 98. The amount of this exemplary recirculation may be controlled by, for example, coordinated operation of low pressure pump 30 and high pressure pump 32. For example, if high pressure pump 32 is not drawing fluid through exemplary secondary filter assembly 40, and low pressure pump 30 continues to operate and supply fluid to secondary filter assembly 40, at least a portion of fluid being supplied to secondary filter assembly 40 by low pressure pump 30 will recirculate through inlet port 102, through first chamber 96 and first portion 108 of filter medium 88, without passing through second portion 114 of filter medium 88, second chamber 98, or outlet port 104 of filter base 52. In this exemplary manner, fluid can be subjected to a plurality of filtration passes in secondary filter assembly 40 without being supplied to high pressure pump 32. For example, first portion 108 of filter medium 88 may be associated with outlet apertures 106 of first chamber 96, and a second portion 114 of filter medium 88 may be associated with inlet apertures 112 of second chamber 98, and the portion of fluid exiting from first chamber 96 that is returned to inlet port 102 for recirculation through first chamber 96 passes through first portion 108 of filter medium 88 at least twice before passing through second chamber 98. According to some embodiments, first portion 108 of filter medium 88 has first filtering characteristics, and second portion 114 of filter medium 88 has second filtering characteristics different from the first filtering characteristics. This may facilitate selective filtration of fluid prior to reaching high pressure pump 32.

INDUSTRIAL APPLICABILITY

The exemplary filter element and filter assembly of the present disclosure may be applicable to a variety of fluid systems. For example, the filter element and filter assembly may be applicable to power systems, such as, for example, compression-ignition engines, gasoline engines, gaseous-fuel-powered engines, and other internal combustion engines known in the art. For example, the filter element and filter assembly may be used in a fuel system, for example, the exemplary fuel system shown in FIG. 1. Use of the disclosed filter element and filter assembly may result in a more desirable level of filtration and/or more efficient component packaging.

For example, exemplary filter element and filter assembly may facilitate more complete filtration from a single filter assembly. Exemplary filter element 56, having first and second chambers 96 and 98, facilitates two filtration passes through filter medium 88 in a single filter assembly. In particular, fluid entering inlet passage 66 of filter assembly 50 passes into and through first chamber 96, through first portion 108 of filter medium 88, through interior space 110 of canister 54, through second portion 114 of filter medium 88, into and through second chamber 98, and exits filter assembly 50 via outlet passage 70. Thus, the fluid passes through filter medium 88 twice during a single pass through filter assembly 50.

In addition, exemplary return aperture 126 and return line 46 facilitate a recirculation of fluid through first chamber 96 and first portion 108 of filter medium 88 before passing through second portion 114 of filter medium 88 and second chamber 96. For example, in the exemplary embodiment of fluid system shown in FIG. 1, if high pressure pump 32 draws a lower volume of fluid through filter assembly 50 (e.g., secondary filter assembly 40 shown in FIG. 1) than low pressure pump 30 supplies to filter assembly 50, then a portion of fluid flowing into first chamber 96 may exit filter assembly 50 via return orifice 134, return passage 136, and return aperture 132 of filter element 50, and flow into return line 46, so that the portion of fluid can be recirculated back into filter assembly 50 via fluid line 34. Upon entry of filter assembly 50 via inlet passage 66, the recirculated portion of fluid passes through first chamber 96 and first portion 108 of filter media 88. In this exemplary manner, fluid can be subjected to more than a single filtration in filter assembly 50 before the fluid is filtered by second portion 114 of filter medium 88. If, for example, high pressure pump 32 draws a sufficient volume of fluid through filter assembly 50, all (or substantially all) of the fluid entering filter assembly 50 passes through both first portion 108 and second portion 114 of filter medium 88 without recirculating as described above.

In addition, according to some embodiments, first portion 108 and second portion 114 of filter medium 88 may have different filtering characteristics. This may permit tailoring of the filtration process, so that different types and/or sizes of particles may be filtered by different portions of filter assembly 50. For example, according to some embodiments, first portion 108 of filter medium 88 may be configured to remove relatively larger particles than second portion 114 of filter medium 88.

According to the exemplary embodiment shown in FIGS. 4-6, filter element 56 may be configured to be received in filter base 52 in more than one orientation (e.g., two orientations). This may be facilitated by filter element 56 having two return apertures 140 and 142 on opposite sides of filter element 56 (e.g., 180 degrees from one another), and filter base 52 having two recesses 156 and 158 on corresponding opposite sides of filter base 52. For embodiments of filter element 56 having first and second chambers 96 and 98 of different configurations (see e.g., FIG. 3), this exemplary ability to install filter element 56 in filter base 52 in different orientations permits selection of an orientation to achieve the desired filtration characteristic, regardless of the orientation of filter base 52 on the machine.

For example, according to some embodiments, filter assembly 50 is reversible with respect to the machine on which it is installed. Space considerations may result in supplying fluid for filtration to filter assembly 50 from one side of filter assembly 50, for example, from the right side as shown in FIG. 2. In such situations, passage 66 of filter base 52 serves as an inlet passage, and passage 70 serves as an outlet passage. However, space considerations may result in supplying fluid for filtration to filter assembly 50 from the other side of filter assembly 50 (i.e., from the left side as shown in FIG. 2). In such situations, passage 70 of filter base 52 serves as an inlet passage, and passage 66 serves as an outlet passage, thereby reversing the flow of fluid though filter base 52. The reversibility of some embodiments of filter element 56 relative filter base 52 facilitates orientation of filter element 56 in filter base 52 to achieve the desired filtration characteristic resulting from differences between the combination of first chamber 96 and/or first portion 108 of filter medium 88 and the combination of second chamber 98 and/or second portion 108 of filter medium 88. This exemplary configuration may increase the options for locations in which filter assembly 50 may be mounted in the machine.

It will be apparent to those skilled in the art that various modifications and variations can be made to the disclosed, exemplary filter elements, filter assemblies, and fluid systems. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A filter element comprising:
   a tubular member having a longitudinal axis and including:
     a partition at least partially defining a first chamber and at least partially defining a second chamber, the partition extending longitudinally in the tubular member and being configured to prevent flow communication between the first chamber and the second chamber within the tubular member;

an end portion at least partially defining an inlet port configured to provide flow communication into the first chamber, and at least partially defining an outlet port configured to provide flow communication exiting from the second chamber;

at least one outlet aperture configured to provide flow communication exiting from the first chamber; and at least one inlet aperture configured to provide flow communication into the second chamber;

a filter medium associated with the at least one outlet aperture and the at least one inlet aperture, wherein the filter element is configured such that fluid passing through the filter element from the inlet port to the outlet port passes through the first chamber, the filter medium, and the second chamber; and an end cap defining a return aperture and a return passage, the return aperture being configured to provide flow communication between fluid exiting from the first chamber and fluid entering the inlet port, the return aperture being in fluid communication with the first chamber via the return passage, the end cap including
a plate extending transverse to the longitudinal axis of the tubular member, the return aperture extending through the plate in a direction parallel to the longitudinal axis, and
a wall extending transverse to the plate, the wall defining a return orifice extending radially through the wall and being in flow communication with the return aperture via the return passage in the end cap.

2. The filter element of claim 1, wherein the end cap is associated with the end portion of the tubular member.

3. The filter element of claim 1, wherein the filter medium includes a first portion associated with the at least one outlet aperture, and a second portion associated with the at least one inlet aperture.

4. The filter element of claim 1, wherein the filter medium includes a first portion associated with the at least one outlet aperture, and a second portion associated with the at least one inlet aperture, and wherein the first portion of the filter medium has first filtering characteristics, and the second portion of the filter medium has second filtering characteristics different from the first filtering characteristics.

5. The filter element of claim 1, wherein the return aperture is a first return aperture, and the end cap further includes a second return aperture in the plate on an opposite side of the end portion of the tubular member from the first return aperture.

6. A filter assembly comprising:
a filter base configured to be coupled to a machine;
a canister having an open end and a closed end and being configured to be coupled to the filter base; and
a filter element configured to be received in the canister, the filter element including:
a tubular member having a longitudinal axis and including:
a partition at least partially defining a first chamber and at least partially defining a second chamber, the partition extending longitudinally in the tubular member and being configured to prevent flow communication between the first chamber and the second chamber within the tubular member;
an end portion at least partially defining an inlet port configured to provide flow communication into the first chamber, and at least partially defining an outlet port configured to provide flow communication exiting from the second chamber;

at least one outlet aperture configured to provide flow communication exiting from the first chamber; and at least one inlet aperture configured to provide flow communication into the second chamber;

a filter medium associated with the at least one outlet aperture and the at least one inlet aperture, wherein the filter element is configured such that fluid passing through the filter element from the inlet port to the outlet port passes through the first chamber, the filter medium, and the second chamber; and an end cap defining a return aperture and a return passage, the return aperture being configured to provide flow communication between fluid exiting from the first chamber and fluid entering the inlet port, the return aperture being in fluid communication with the first chamber via the return passage, the end cap including
a plate extending transverse to the longitudinal axis of the tubular member, the return aperture extending through the plate in a direction parallel to the longitudinal axis, and
a wall extending transverse to the plate, the wall defining a return orifice extending radially through the wall and being in flow communication with the return aperture via the return passage in the end cap.

7. The filter assembly of claim 6, wherein the return aperture is a first return aperture, and the end cap further includes a second return aperture on an opposite side of the end portion of the tubular member from the first return aperture.

8. The filter assembly of claim 7, wherein the filter base includes a recess configured to correspond to the second return aperture, and wherein the recess is configured to block fluid flow communication from the second return aperture.

9. The filter assembly of claim 8, wherein the end cap includes a first flange extending around the first return aperture and a second flange extending around the second return aperture, and wherein a return port of the filter base is configured to receive the first flange and the recess of the filter base is configured to receive the second flange.

10. A fuel system comprising:
a pump configured to draw fuel from a tank and supply fuel to an engine;
a primary filter assembly in flow communication with the pump and configured to at least one of separate fluid from the fuel and filter particles from the fuel;
a secondary filter assembly in flow communication with the pump and configured to filter particles from the fuel; and
fluid lines providing flow communication between the primary filter assembly and the pump, and between the pump and a secondary filter assembly,
wherein the secondary filter assembly includes:
a filter base;
a canister having an open end and a closed end and being configured to be coupled to the filter base; and
a filter element configured to be received in the canister, the filter element including:
a tubular member having a longitudinal axis and including:
a partition at least partially defining a first chamber and at least partially defining a second chamber, the partition extending longitudinally in the tubular member and being configured to prevent flow communication between the first chamber and the second chamber within the tubular member;

an end portion at least partially defining an inlet port configured to provide flow communication into the first chamber, and at least partially defining an outlet port configured to provide flow communication exiting from the second chamber;

at least one outlet aperture configured to provide flow communication exiting from the first chamber; and at least one inlet aperture configured to provide flow communication into the second chamber;

a filter medium associated with the at least one outlet aperture and the at least one inlet aperture, wherein the filter element is configured such that fluid passing through the filter element from the inlet port to the outlet port passes through the first chamber, the filter medium, and the second chamber; and an end cap defining a return aperture and a return passage, the return aperture being configured to provide flow communication between fluid exiting from the first chamber and fluid entering the inlet port, the return aperture being in fluid communication with the first chamber via the return passage, the end cap including a plate extending transverse to the longitudinal axis of the tubular member, the return aperture extending through the plate in a direction parallel to the longitudinal axis, and a wall extending transverse to the plate, the wall defining a return orifice extending radially through the wall and being in flow communication with the return aperture via the return passage in the end cap.

11. The fuel system of claim 10, further including a return line between the secondary filter assembly and the fluid line between the primary filter assembly and the pump, wherein the first chamber is fluidly coupled to the inlet port via the return line.

12. The fuel system of claim 11, further including a check valve in the return line, the check valve being configured to prevent flow of fluid into the return aperture of the secondary filter assembly without passing through the first chamber of the tubular element.

13. The fuel system of claim 10, wherein the filter medium includes a first portion associated with the at least one outlet aperture, and a second portion associated with the at least one inlet aperture.

\* \* \* \* \*